(12) United States Patent
Tanaka

(10) Patent No.: US 7,740,778 B2
(45) Date of Patent: Jun. 22, 2010

(54) CONDUCTIVE BELT, METHOD OF PRODUCING SAME, AND IMAGE-FORMING APPARATUS HAVING SAME

(75) Inventor: Masakazu Tanaka, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 321 days.

(21) Appl. No.: 11/826,014

(22) Filed: Jul. 11, 2007

(65) Prior Publication Data

US 2008/0038658 A1 Feb. 14, 2008

(30) Foreign Application Priority Data

Aug. 11, 2006 (JP) .............................. 2006-220574

(51) Int. Cl.
*G03G 5/153* (2006.01)

(52) U.S. Cl. .............. 264/105; 264/328.17; 264/328.18

(58) Field of Classification Search ................. 264/105, 264/328.17, 328.18
See application file for complete search history.

(56) References Cited

U.S. PATENT DOCUMENTS 6,149,848 A * 11/2000 Makise et al. ............... 264/105

FOREIGN PATENT DOCUMENTS

JP 2002-132053 A 5/2002
JP 2006-152131 A 6/2006

* cited by examiner

*Primary Examiner*—Kat Wyrozebski
*Assistant Examiner*—Xue Liu
(74) *Attorney, Agent, or Firm*—Birch, Stewart, Kolasch & Birch, LLP

(57) ABSTRACT

A method of producing a conductive belt composed of a base resin containing polybutylene naphthalate resin at not less than 50 mass % nor more than 100 mass % and 1 to 3 mass % of carbon nano-fibers having a DBP oil absorption amount at not less than 150 ml/100 g. The method includes the steps of forming a conductive master batch by mixing the carbon nano-fibers with resin for use in a master batch containing the polybutylene naphthalate resin; mixing the obtained conductive master batch and resin for blending use containing the polybutylene naphthalate resin and not containing the carbon nano-fibers with each other in an unmelted state by setting a mixing mass ratio of the conductive master batch smaller than that of the resin for blending use; and meltingly molding an obtained mixture by an extrusion molder.

6 Claims, 3 Drawing Sheets

CONDUCTIVE BELT, METHOD OF PRODUCING SAME, AND IMAGE-FORMING APPARATUS HAVING SAME

This Nonprovisional application claims priority under 35 U.S.C. §119(a) on Patent Application No(s). 2006-220574 filed in Japan on Aug. 11, 2006, the entire contents of which are hereby incorporated by reference.

BACKGROUND OF THE INVENTION

1. Field of the Invention

The present invention relates to a method of producing a conductive belt, the conductive belt produced by the method, and an image-forming apparatus having the conductive belt mounted thereon.

2. Description of the Related Art

An image-forming apparatus such as a copying machine, a facsimile, a printer, and the like for forming an image by an electrophotographic method or an electrostatic printing method has a conductive belt as a transport belt, a transfer belt, an intermediate transfer belt, a fixing belt, a developing belt, a belt for use in an electrophotographic photoreceptor, and the like.

It is necessary for the conductive belt to have a proper stable volume resistivity. As the method of imparting conductivity to the conductive belt, a method of adding a conductive material such as a metal oxide, carbon black or the like to a polymer material is known. For example, the conductive endless belt using the carbon black as the conductive material thereof is described in claim 8 of Japanese Patent Application Laid-Open No. 2002-132053 (patent document 1).

When the electronic conductive material represented by the carbon black is used, in dependence on the dispersion state of particles of the conductive material, an electric resistance value fluctuates to a very high extent inside the belt and among products. Another problem in the use of the electronic conductive material is that when agglomerates of the electronic conductive material are generated in kneading of polymer materials or in a melt extrusion by an extrusion molder, electric current collectively flows therethrough. As a result, it is difficult to control the electric resistance value of the belt and further a large number of very small projections of the agglomerations are formed on the surface of the belt. For example, when the belt is used as an intermediate transfer belt, an obtained image has an irregularity.

To make the belt conductive with the carbon black and adjust the electric resistance value of the belt to an appropriate value of $1.0\times10^6$ to $1.0\times10^{12}$ $\Omega\cdot$cm, it is necessary to use not less than 10 mass % of the carbon black. When the mixing amount of the carbon black is large, the conductive belt becomes brittle, which may make it impossible to perform extrusion molding. For example, even though the polymer composition is molded in the shape of a belt, the conductive belt is inferior in its durability when it is driven continuously and is thus unsuitable as the belt of an image-forming apparatus. This tendency is conspicuous in a belt containing polybutylene naphthalate resin used as a polymer material, although the extent of the brittleness of the belt is different to some extent according to the kind of the polymer material.

To solve the above-described problems, a resin composition containing the carbon nano-fiber having the DBP oil absorption amount at not less than 150 ml/100 g is disclosed in Japanese Patent Application Laid-Open No. 2006-152131 (patent document 2). In this resin composition, the carbon nano-fiber serving as the conductive material has an excellent dispersibility. Thus agglomerates are not generated and the resin composition has a uniform and high conductivity, although it contains a small amount of the carbon nano-fiber.

A conductive belt was formed in accordance with the producing method described in the example of the patent document 2 by using the polybutylene naphthalate resin as the resin composing the conductive belt. As a result, the following problem occurred.

The carbon nano-fiber having the property described in the patent document 2 was added to the polybutylene naphthalate resin at the rate described in the example to form a compound of a resin composition. A belt-shaped molding was formed from the compound by extrusion molding based on the same principle as that of melt spinning method carried out in the example of the patent document 2. The obtained belt was very brittle and was unsuitable for practical use.

Patent document 1: Japanese Patent Application Laid-Open No. 2002-132053

Patent document 2: Japanese Patent Application Laid-Open No. 2006-152131

SUMMARY OF THE INVENTION

It is an object of the present invention to provide a method of producing a conductive belt which has excellent moldability and surface smoothness by composing the conductive belt of a conductive material that is excellent in its dispersibility, shows a uniform electric resistance value, and does not generate agglomerates, and which is durable to such an extent that it is not crackled or broken when it is driven continuously.

The present invention provides a method of producing a conductive belt composed of a base resin containing polybutylene naphthalate resin at not less than 50 mass % nor more than 100 mass % and 1 to 3 mass % of carbon nano-fibers having a DBP oil absorption amount at not less than 150 ml/100 g. The method includes the steps of forming a conductive master batch by mixing the carbon nano-fibers with resin for use in a master batch containing the polybutylene naphthalate resin; mixing the obtained conductive master batch and resin for blending use containing the polybutylene naphthalate resin and not containing the carbon nano-fibers with each other in an unmelted state by setting a mixing mass ratio of the conductive master batch smaller than that of the resin for blending use; and meltingly molding an obtained mixture by an extrusion molder.

The present inventors have investigated the above-described producing method. As a result, they have considered that the conventional conductive belt becomes brittle because the polybutylene naphthalate resin undergoes a thermal history at not less than two times. Thus by trial and error they have examined a producing method in which the polybutylene naphthalate resin undergoes the thermal history as little as possible. At the step of mixing the carbon nano-fibers with the resin for the master batch and at the extrusion molding step, the polybutylene naphthalate resin is unavoidably exposed to high-temperature heat. They divided the polybutylene naphthalate resin contained in the conductive belt into two parts in such a way that the one part of the polybutylene naphthalate resin is subjected to the thermal history at the above-described two steps and that the other part thereof is subjected to the high-temperature heat at only the extrusion molding step. They have found that the above-described object can be achieved by setting the mixing ratio of the other part higher than that of the one part. They have investigated the specific method and developed the producing method of the present invention.

In the method of producing the conductive belt of the present invention, the carbon nano-fibers having the DBP oil absorption amount at not less than 150 ml/100 g are used as the conductive material.

The carbon nano-fibers of the present invention are microfine.

It is favorable that the diameter of each carbon nano-fiber is in the range of 0.5 to 500 nm and more favorable that the diameter thereof is in the range of 5 to 100 nm. When multilayer nano-tubes is used as the carbon nano-fibers, the diameter of an outermost carbon nano-tube is regarded as the diameter of the multi-layer nano-tubes.

If the diameters of the carbon nano-fibers are less than the above-described specified lower limit value, the carbon nano-fibers are liable to agglomerate. Consequently it is difficult to uniformly disperse them in the base resin. On the other hand, if the diameters of the carbon nano-fibers are more than the above-described specified upper limit value, it is difficult to provide the conductive belt with a high conductivity by adding a small amount of the carbon nano-fibers to the base resin.

It is favorable that the aspect ratio of the carbon nano-fiber to be used in the present invention is not less than 10. When the carbon nano-fiber has the aspect ratio at not less than 10, it is easy to disperse the carbon nano-fiber uniformly in the base resin and bring them into contact each other. Thereby the conductive belt is capable of obtaining a uniform conductivity.

As the carbon nano-fiber, it is possible to exemplify a so-called carbon nano-tube.

As the carbon nano-tube, it is possible to list a single-layer carbon nano-tube composed of a cylindrical one layer of a graphene sheet in which carbon atoms connected with one another like a honeycomb spread flatly, a multi-layer carbon nano-tube composed of not less than two layers of graphene sheets concentric and cylindrical or coiled. In the present invention, the single-layer carbon nano-tube and the multi-layer carbon nano-tube may be mixedly present.

It is possible to use a carbon material having the structure of the carbon nano-tube partly. In addition to the carbon nano-tube having holes formed at both sides thereof, it is possible to use a carbon nano-horn in which one side of the carbon nano-tube is closed, and a cup-shaped nano-carbon substance having a hole formed at its head.

The carbon nano-fiber to be used in the present invention may have an inside-filled structure. In addition, it is possible to use the carbon nano-fiber having the following structure: The carbon layer of the carbon nano-fiber may have a spiral structure; the carbon layer thereof extends in the longitudinal direction of the fibers; and the carbon layer extends in a radial direction of the fibers.

The DBP oil absorption amount (oil absorption amount of dibutyl phthalate) is the oil absorption amount of dibutyl phthalate in 100 g of the carbon nano-fiber. The DBP oil absorption amount is used as an index showing the structure of carbon black (carbon powder) or the like. The DBP oil absorption amount can be measured in accordance with ASTM D-2414.

The DBP oil absorption amount is set to not less than 150 ml/100 g for the reason described below. As the amount of the DBP oil absorption amount becomes larger, carbon is increasingly liable to form a beadlike chain (carbon structure). Thus an agglomerate is hardly generated, and the resin composition or the conductive belt can be provided with a high conductivity by the addition of a small amount of the carbon nano-fiber to the base resin. If the amount of the DBP oil absorption amount is less than 150 ml/100 g, the carbon nano-fiber is bulky and has a low dispersibility, and it is difficult for the carbon to form the chain. Thus it is necessary to add a very large amount of the carbon nano-fiber used to allow the resin composition or the conductive belt to have a high conductivity to the base resin. Consequently the material of the conductive belt has a low processability and flexing resistance.

Although the upper limit value of the DBP oil absorption amount is not limited to a specific value, it is preferable to set the DBP oil absorption amount to not more than 600 ml/100 g. If the DBP oil absorption amount is too large, the carbon chain is broken by various shearing forces applied to the carbon nano-fiber at material-kneading and molding steps. Thereby there is a fear that the electric resistance value fluctuates and becomes unstable.

The carbon nano-fiber is contained in the conductive belt of the present invention at the rate of 1 to 3 mass %. If the content of the carbon nano-fiber is less than 1 mass %, it is difficult to adjust the volume resistivity of the conductive belt to $1.0 \times 10^6$ to $1.0 \times 10^{12}$ Ω·cm. On the other hand, if the content of the carbon nano-fiber is more than 3 mass %, the belt is brittle and has a low durability and moreover even extrusion molding cannot be performed.

Not less than 50 mass % nor more than 100 mass % of the polybutylene naphthalate resin is contained in the base resin in which the carbon nano-fibers are dispersed.

The polybutylene naphthalate resin to be used in the present invention includes not only resin obtained by polycondensation of 2,6-naphthalenedicarboxylic acid and 1,4-butanediol, but also a copolymer composed of a hard segment consisting of polybutylene naphthalate and a soft segment. It is possible to list the soft segment consisting of polyether which will be described in detail below and the soft segment consisting of polyester.

In the present invention, as the base resin, polymers other than the polybutylene naphthalate resin may be used in combination with the polybutylene naphthalate resin.

Known polymers may be used as the other polymers so long as the use thereof are not contradictory to the object of the present invention. It is possible to exemplify polyester resin such as polyethylene terephthalate; polyolefin resin such as polypropylene, polyethylene, and the like; polyamide resin such as nylon; acrylonitrile-butadiene-styrene resin; and polycarbonate resin.

As the preferable other polymers, polyester thermoplastic elastomers can be exemplified.

According to properties demanded for the conductive belt of the present invention, it is possible to use the polyester thermoplastic elastomers having various degrees of hardness, elastic modulus, moldability, and the like. It is possible to exemplify polyester polyether thermoplastic elastomers and polyester polyester thermoplastic elastomers. These polyester thermoplastic elastomers may used as a mixture.

As the polyester thermoplastic elastomers, a copolymer composed of the hard segment consisting of the polyester having an aromatic ring and the soft segment consisting of the polyether and/or the polyester.

As constituent components of the hard segment consisting of the polyester having the aromatic ring, it is possible to use aromatic dicarboxylic acids such as terephthalic acid, isophthalic acid, diphenyldicarboxylic acid, 2,6-naphthalenedicarboxylic acid; esters of the aromatic dicarboxylic acids; glycols having 1 to 25 carbon atoms; and ester-forming derivatives of the glycols.

It is preferable to use the terephthalic acid as the acidic component. Although it is preferable to use only the terephthalic acid, it is possible to use other acidic components in combination with the terephthalic acid as necessary. When other acidic components are used in combination with the terephthalic acid, the entire moles % of the acidic component contains favorably not less than 70 moles % of the terephthalic acid and more favorably not less than 75 moles %.

As the glycols having 1 to 25 carbon atoms, ethylene glycol, 1,4-butanediol, and the like are listed.

As the soft segment consisting of the polyether, it is possible to list poly(alkylene ether) glycol such as poly (ethylene oxide) glycol and poly (tetramethylene oxide) glycol. In the alkylene part, the number of carbon atoms is not limited to two and four in the exemplified compounds, but is favorably 2 to 20 and more favorably 2 to 10.

It is preferable that the soft segment consisting of the polyether is contained at 15 to 75 mass % of the entire mass % of the polyester polyether thermoplastic elastomer.

It is preferable to use lactones as the soft segment consisting of the polyester. Caprolacton is most favorable of the lactones. In addition, it is possible to use enanlacton or caprylolacton. It is possible to use not less than two kinds of these lactones in combination.

In the polyester polyester thermoplastic elastomers, copolymerization ratio between the aromatic polyester and the lactones is selected according to a use. The normal copolymerization ratio (mass ratio) of the aromatic polyester to the lactones is 97:3 to 5:95 and favorably 95:5 to 30:70.

When the polybutylene naphthalate resin and the exemplified other polymer are used in combination as the base resin, the mixing amount of the polybutylene naphthalate resin is set to not less than 50 mass %, favorably not less than 75 mass %, and more favorably not less than 90 mass %.

The method of producing the conductive belt of the present invention is described below.

Initially the conductive master batch is formed by mixing the carbon nano-fibers with the resin for use in the master batch containing the polybutylene naphthalate resin.

The composition of the resin for the master batch may be identical to or different from that of the base resin. It is to be noted that the addition of the resin for the master batch and the resin for blending use which will be described later forms the base resin. Thus a component not contained in the base resin is not contained in the resin for blending use either.

The resin for the master batch may consist of the polybutylene naphthalate resin or may consist of the combination of the polybutylene naphthalate resin and the exemplified other polymers. When the polybutylene naphthalate resin and the other polymer are used in combination, the mixing amount of the polybutylene naphthalate resin is favorably not less than 50 mass %, more favorably not less than 75 mass %, and most favorably not less than 90 mass %.

The content of the carbon nano-fiber contained in the conductive master batch is set larger than the content of the carbon nano-fiber contained in the conductive belt which is an end product. At a subsequent step, the content of the conductive master batch is decreased by mixing it with the resin for blending use to obtain the predetermined content of the carbon nano-fibers.

The upper limit value of the content of the carbon nano-fibers is set to 10 mass %. If the upper limit value of the content of the carbon nano-fiber is more than 10 mass %, it is difficult to uniformly disperse the carbon nano-fiber in the resin for the master batch.

More specifically, it is preferable that the content of the carbon nano-fiber contained in the conductive master batch is 3 to 10 mass %.

As the method of mixing the carbon nano-fiber with the resin for the master batch, it is possible to use a single screw extruder, a twin screw extruder, a closed kneader, an open roll or a kneader.

Thereafter the obtained conductive master batch and the resin for blending use are mixed with each other without melting them. That is, the conductive master batch and the resin for blending use are mixed with each other at a temperature lower than the melting point of the polybutylene naphthalate resin, the melting point of the resin for the master batch, and the melting points of polymers, other than the polybutylene naphthalate resin, contained in the resin for blending use which will be described later.

It is possible to subject the polybutylene naphthalate resin to the thermal history to a minimum at the above-described step. More specifically, in the conventional producing method, heat is applied to the polybutylene naphthalate resin twice at the step of mixing the polybutylene naphthalate resin with the resin for the master batch and at the extrusion molding step. But in the present invention, by adopting the above-described step, the polybutylene naphthalate resin contained in the resin for blending use undergoes the thermal history only once at the extrusion molding step. Further as described later, the mixing ratio of the resin for blending use is set higher than that of the conductive master batch. Thus more than half of the entire polybutylene naphthalate resin is heated once. Therefore the conductive belt of the present invention can be prevented from becoming brittle and display excellent durability even though it is continuously driven.

At this step, it is preferable to physically mix, namely, dry-blend the conductive master batch and the resin for blending use with each other without heating them and without adding a solvent thereto. It is possible to exemplify a method of dry-blending a pellet of the conductive master batch and a pellet of the resin for blending use.

The composition of the resin for blending use may be identical to or different from that of the base resin. It is to be noted that as described above, the addition of the resin for the master batch and the resin for blending use which will be described later forms the base resin. Thus a component not contained in the base resin is not contained in the resin for blending use either.

The resin for blending use may consist of the polybutylene naphthalate resin or may consist of the combination of the polybutylene naphthalate resin and the exemplified other polymers. When the polybutylene naphthalate resin and other polymer are used in combination, the mixing amount of the polybutylene naphthalate resin is favorably not less than 50 mass %, more favorably not less than 75 mass %, and most favorably not less than 90 mass %.

The resin for blending use does not contain the carbon nano-fiber to prevent it from undergoing the thermal history which is inevitably applied thereto.

The mixing ratio between the conductive master batch and the resin for blending use in the above-described step is so set that the conductive master batch is lower than the resin for blending use in the mass ratio. As described above, the polybutylene naphthalate resin contained in the resin for blending use undergoes the thermal history once. Thus by setting the mixing ratio of the resin for blending use higher than that of the conductive master batch, there is an increase in the rate of the polybutylene naphthalate resin which is little deteriorated by being heated.

More specifically it is preferable that the mixing ratio between the conductive master batch and the resin for blending use is set to 5:5 to 2:8 in the mass ratio. If the mixing amount of the conductive master batch exceeds that of the resin for blending use, the rate of the resin subjected to the thermal history becomes large. Consequently an end extruded product is brittle. On the other hand, if the conductive master batch/the resin for blending use (mass ratio) is less than 2/8, it is difficult to allow the conductive belt to have a low electric resistance value and adjust the electric resistance value thereof to a desired electric resistance value.

The conductive belt of the present invention can be obtained by meltingly molding the obtained mixture by an extrusion molder.

More specifically, the obtained mixture is introduced into the extrusion molder from a material supply port thereof. The mixture melted in the extrusion molder is introduced into a molding die and shaped annularly by using a cross head die. After the melt is extruded vertically downward from an annular die lip, the extruded melt is brought into contact with an outer wall surface of an inside sizing unit which is a sizing die provided at a position downstream from the die lip to cool the extruded melt. In this manner, a hardened continuous extruded tube is obtained. The extruded tube is cut into a predetermined length by a cutting apparatus provided at a position downstream of the inside sizing unit to obtain the conductive belt of the present invention.

The melt is pressed out of the die lip vertically downward and is guided to the sizing die without being influenced by gravity and residual strain thereof decreases and with the melt keeping a cylindrical state. Thus the melt has a dimensional accuracy.

The condition of the extrusion molding is appropriately adjusted according to the composition of the base resin or the content of the carbon nano-fiber. For example, it is preferable to set the temperature inside the extruder higher by 10° C. than the melting point of a polymer which is highest of the melting points of other polymers composing the base resin. Although the highest temperature inside the extruder is not limited to a specific temperature, it is preferable to set a temperature at which the base resin does not deteriorate. Thus the temperature inside the extruder is set to favorably not more than 350° C. and more favorably not more than 320° C.

In the present invention, a coating layer may be formed on the peripheral surface of the conductive belt. For example, the coating layer can be formed by selecting a known coating material according to an object. The main polymer of the coating material consists of urethane, acrylic resin or rubber latex. Fluororesin is dispersed in the main polymer. Coating treatment is performed by using a known method such as electrostatic deposition, spray coating, dipping or brush paint.

By forming the coating layer on the peripheral surface of the conductive belt used as an intermediate transfer belt of an image-forming apparatus, it is possible to easily scrape toner which has remained on the surface of the intermediate transfer belt at a transfer time, change the attaching and removal performance of the toner, and control the surface energy.

It is preferable that the thickness of the coating layer is 1 to 20 μm. A plurality of coating layers may be formed or the coating layer may be formed on the inner peripheral surface of the belt.

It is preferable that the conductive belt produced by the above-described producing method has a volume resistivity of $1.0 \times 10^6$ to $1.0 \times 10^{12}$ Ω·cm.

If the volume resistivity is less than the lower limit of the above-described range, electric current flows easily. Thus the conductive belt does not function as a conductive member. For example, it is difficult to hold an electric charge. When the conductive belt of the present invention is used as the intermediate transfer belt, it is necessary to set the volume resistivity thereof to not less than $1.0 \times 10^6$ Ω·cm to hold a toner electrostatic latent image. On the other hand, if the volume resistivity is more than the upper limit of the above-described range, a high voltage is necessary in the process of transfer, electric charge, and toner supply and the transfer efficiency deteriorates.

It is preferable to set the thickness of the conductive belt of the present invention to 50 to 500 μm. The thickness of the conductive belt can be changed by adjusting the gap of a die lip in performing extrusion molding or by adjusting the discharge amount of the resin and the take-off speed of the conductive belt. If the thickness of the conductive belt is less than 50 μm, it becomes longer easily. For example, a deviation occurs when an image is formed by a color image-forming apparatus with toners having different colors superimposed on each other. On the other hand, if the conductive belt is thicker than 500 μm, the conductive belt has a large bending rigidity and thus the conductive belt cannot be mounted on a driving shaft.

The conductive belt of the present invention can be widely used in many uses which require conductivity. It is especially preferable to use the conductive belt for the image-forming apparatus such as a copying machine, a facsimile, a printer, and the like. That is, the present invention provides the image-forming apparatus having the conductive belt produced by the producing method of the present invention.

Because the image-forming apparatus has the conductive belt of the present invention, the image-forming apparatus is capable of providing a uniform image and displaying a stable quality for a long time.

The effect of the present invention is described below. According to the method of producing the conductive belt, it is possible to subject the resin for blending use contained in the conductive belt to the thermal history only once at a molding time. More specifically, in the conventional producing method, high-temperature heat is applied to the entire resin contained in the conductive belt twice at the step of mixing the polybutylene naphthalate resin with the resin for the master batch and at the extrusion molding step. But unlike the conventional producing method, in the producing method of the present invention, the resin undergoes less thermal history. Consequently it is possible to prevent the conductive belt from becoming brittle. Further the conductive belt is not crackled or broken when it is continuously driven, thus displaying excellent durability.

In the conductive belt of the present invention, the carbon nano-fiber, serving as the conductive material, which is contained therein has a favorable dispersibility, and shows a uniform electric resistance value.

Because the carbon nano-fiber has a favorable dispersibility, it allows the conductive belt to display a high conductivity, even though the mixing amount of the carbon nano-fiber is small. Because the carbon nano-fiber is expensive, it is possible to decrease the producing cost by decreasing the mixing amount of the carbon nano-fiber while the conductive belt maintains a high conductivity.

In the conductive belt of the present invention, the carbon nano-fiber has a favorable dispersibility and is used in a small amount. Therefore the carbon nano-fiber little generates agglomerates. Consequently it is possible to easily mold the resin composition into the conductive belt and obtain the conductive belt having a smooth surface without generating a large number of slight projections on the surface thereof.

Thereby the image-forming apparatus having the conductive belt of the present invention mounted thereon provides a high-quality image.

DETAILED DESCRIPTION OF THE PREFERRED EMBODIMENTS

Figure 1:
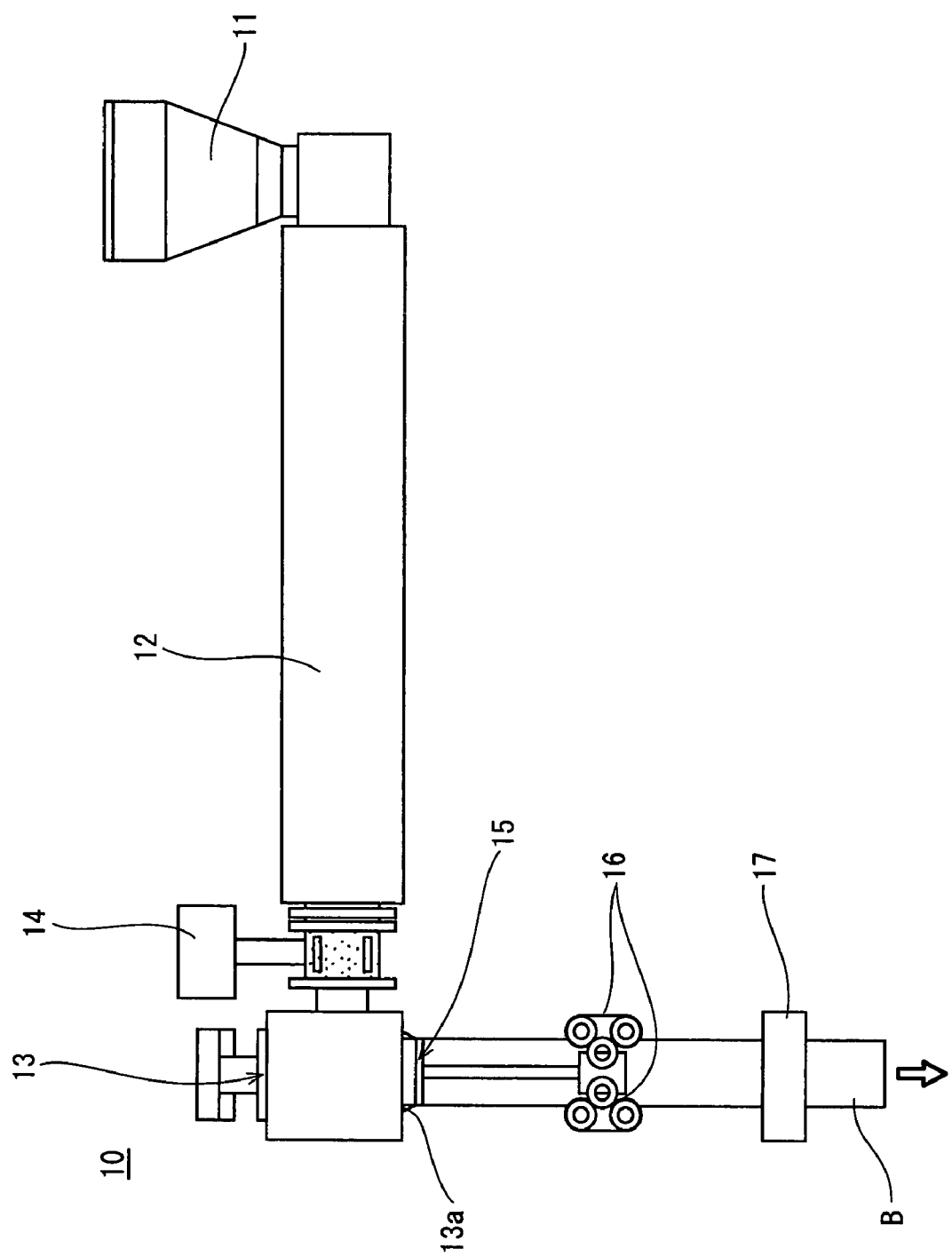
FIG. 1 is a schematic view showing an apparatus for producing a conductive belt.

An embodiment of the method of producing the conductive belt of the present invention and an embodiment of an image-forming apparatus having the conductive belt produced by the method are described below.

A DBP oil absorption amount of carbon nano-fibers to be used in the embodiment is set to 150 to 400 ml/100 g.

It is favorable that in the carbon nano-fibers to be used in the present invention, the volume resistance value of a compacted body thereof is set to not more than 1.0 $\Omega \cdot cm$. When the volume resistance value of the compacted body is more than 1.0 $\Omega \cdot cm$, there is a possibility that a sufficient conductivity cannot be obtained with the carbon nano-fibers being dispersed in a base resin. The lower limit value of the volume resistance value is not limited to a specific value. But the volume resistance value of the compacted body is set more favorably to not less than $1.0 \times 10^{-4}$ $\Omega \cdot cm$ and most favorably to not less than $1.0 \times 10^{-3}$ $\Omega \cdot cm$.

It is favorable that the diameter of the carbon nano-fiber to be used in the present invention is set to the range of 5 to 100 nm. It is favorable that the aspect ratio of the carbon nano-fiber to be used in the present invention is set to not less than 10. When the aspect ratio of the carbon nano-fiber is set to not less than 10, the carbon nano-fibers can be easily uniformly dispersed in the base resin and are capable of easily contacting each other. Thereby the conductive belt can be provided with a uniform conductivity.

It is preferable that a BET specific surface area of the carbon nano-fiber to be used in the present invention is set to not more than 400 $m^2/g$. If the BET specific surface area is more than 400 $m^2/g$, the carbon nano-fibers contact the resin in an excessively large area. Thereby the property of the base resin is damaged, and the strength of the resin and the viscosity thereof at kneading and molding times become high. Thus there is a possibility that flowability thereof is lost.

The carbon nano-fibers are contained in the entire conductive belt of the present invention at the rate of 1 to 3 mass % for the entire conductive belt. The content of the carbon nano-fibers is set to more favorably 1.5 to 2.5 mass % and more favorably 1.5 to 2.0 mass %.

As the carbon nano-fibers to be used in the present invention, it is possible to use those commercially available and those produced by known methods.

As the method of producing the carbon nano-fiber, it is possible to use an arc discharge method, a laser vaporization method, a gas phase growth method, a carbon dioxide catalytic hydrogen reducing method, a CVD method, and HiPco method of growing the carbon nano-fiber in a gas phase by reacting carbon monoxide with an iron catalyst at high temperature and pressure. It is especially favorable to produce the carbon nano-fiber by the gas phase growth method.

As the method of producing the carbon nano-fiber by the gas phase growth method, it is possible to use a method of using a mixed gas of carbon monoxide and hydrogen or a mixed gas of carbon dioxide and the hydrogen as the material thereof and adjusting the combination of catalysts to make the reaction condition appropriate.

More specifically, it is possible to produce the carbon nano-fiber by using a method of using catalyst particles composed of one or not less than two oxides selected from among oxides of Fe, Ni, Co, Mn, and Cu and one or not less than two oxides selected from among oxides of Mg, Ca, Al, and Si, adjusting the combination of catalysts, and supplying the mixed gas of the carbon monoxide and the hydrogen or the mixed gas of the carbon dioxide and the hydrogen to the catalyst particles within a given temperature range for a certain period of time. It is favorable to treat the material with the hydrogen gas for not less than 10 minutes at the same temperature as a reaction temperature after a reaction takes places. By carrying out this method, it is possible to obtain the carbon nano-fiber which consists of an aggregate (amorphous polycrystal structure) of micro-fine units of graphene sheet and is lipophilic and thus has the DBP oil absorption amount at not less than 150 ml/100 g.

In the present invention, it is possible to make surface treatment such as ion injection treatment, sputter etching treatment or plasma treatment before the carbon nano-fiber and the resin for the master batch are kneaded.

In the present invention, the base resin consists of the polybutylene naphthalate resin.

As the polybutylene naphthalate resin, a copolymer composed of a hard segment consisting of the polybutylene naphthalate and a soft segment. The soft segment consisting of polyether is preferable.

In the present invention, components other than the carbon nano-fiber may be added to the base resin so long as the use thereof is not contradictory to the object of the present invention.

As the above-described other components, a filler, a softener, an age resistor, and the like are listed. The filler may be added to the base resin to improve the mechanical strength of the resin composition composing the conductive belt. As the filler, it is possible to use calcium carbonate, silica, clay, talc, barium sulfate, and diatomaceous earth. The softener is added to the base resin to appropriately adjust the hardness and flexibility of the conductive belt. It is possible to list fatty acids such as stearic acid, lauric acid, and the like; cottonseed oil, tall oil, asphalt substances, paraffin wax, and the like. The range of the mixing amount of the softener is so adjusted that the softener does not cause liberation of additives from the surface of the conductive belt, bleeding, blooming, and stain of an electrophotographic photoreceptor and the like owing to transfer thereof to parts with which the conductive belt contacts nor adversely affect the conductivity of the conductive belt. As the age resistor, imidazoles, amines, phenols, and the like are listed.

The method of producing the conductive belt of the present invention is described below.

Initially the conductive master batch is formed by mixing the carbon nano-fibers with the resin for use in the master batch.

The composition of the resin for the master batch is identical to that of the base resin and consists of the polybutylene naphthalate resin. The resin for the master batch may contain additives other than the resin component.

The content of the carbon nano-fiber of the conductive master batch is invariably larger than that of the carbon nano-fiber of the conductive belt, namely, the end product. More specifically it is preferable that the content of the carbon nano-fiber in the conductive master batch is 3 to 8 mass %.

A known method can be used to mix the carbon nano-fiber with the resin for the master batch. The temperature at a kneading time is not limited to a specific temperature. But it is preferable that the temperature at a kneading time is set to +10° C. to +30° C. of the melting point of the polybutylene naphthalate resin to prevent it from being thermally deteriorated.

Thereafter a pellet of the obtained conductive master batch and a pellet of the resin for blending use are dry-blended with each other.

The composition of the resin for blending use is identical to that of the base resin and consists of the polybutylene naphthalate resin. The resin for blending use may contain additives other than the resin component.

The mixing ratio between the conductive master batch and the resin for blending use to be mixed with each other is so set that the mass ratio of the conductive master batch is lower than that of the resin for blending use. More specifically, it is preferable that the mixing ratio (mass ratio) between the conductive master batch and the resin for blending use is set to 4:6 to 3:7.

The conductive belt is produced by meltingly molding the obtained mixture by an extrusion molder.

FIG. 1 shows a molder 10. The molder 10 has a hopper 11 to which a material is supplied; an extrusion unit 12 for extruding the supplied material in a fused state; a cross head die 13, having an annular construction, whose axis is perpendicular to the axis of the extrusion unit 12; a gear pump 14, disposed between the extruder 12 and the cross head die 13, for adjusting the extrusion amount; an inside sizing unit 15 for shaping an extruded annular material B in the direction from the inner peripheral side thereof; a take-off unit 16 for vertically taking off the shaped annular material B; and an automatic cutting unit 17 for cutting the annular material B continuously shaped to a predetermined length. The cross head die 13 extrudes the fused material vertically downward from a die lip 13a thereof.

The mixture obtained in the above-described step is supplied to the hopper 11 and meltingly mixed at 200° C. to 350° C. and favorably at 250° C. to 300° C. in the extruder 12. The fused material is fed to the cross head die 13, with the gear pump 14 adjusting the extrusion amount of the material. The fused material is extruded annularly and vertically downward from the die lip 13a of the annular cross head die 13. At this time, the temperature of the die is favorably 200 to 350° C., more favorably 230 to 300° C. and most favorably 260 to 280° C. The annular material B extruded from the die lip 13a is fed downward along the inside sizing unit 15, with the annular material B being cooled to 70° C. to 150° C. to form it into the shape of a belt. The belt-shaped material is fed vertically downward at a speed of 0.5 to 3 m/minute and received by the take-off unit 16. Thereafter the automatic cutting unit 17 cuts the belt-shaped material to a predetermined length. In this manner, the conductive belt of the present invention is produced.

The conductive belt of the present invention obtained in the above-described method has a volume resistivity of $1.0 \times 10^6$ to $1.0 \times 10^{12}$ Ω·cm. A preferable range of the volume resistivity is different according to a use and thus cannot be the unconditionally. For example, when the conductive belt of the present invention is used as an intermediate transfer belt, the volume resistivity thereof is favorably $1.0 \times 10^6$ to $1.0 \times 10^{10}$ (Ω·cm) and more favorably $1.0 \times 10^6$ to $1.0 \times 10^8$ (Ω·cm).

It is preferable to set the thickness of the conductive belt of the present invention to 50 to 200 μm.

The conductive belt of the present invention has an excellent durability. As an index showing that the excellent durability of the conductive belt of the present invention, the conductive belt spanned between two shafts is rotated 10,000 times at a speed of 200 mm/second in environment having a temperature of 23° C. and a relative humidity of 55%. When the state of the conductive belt is observed thereafter, it does not have any cracks or tears.

The conductive belt of the present invention is used for an image-forming apparatus. The embodiment of the image-forming apparatus having the conductive belt of the present invention is described below.

Figure 2:
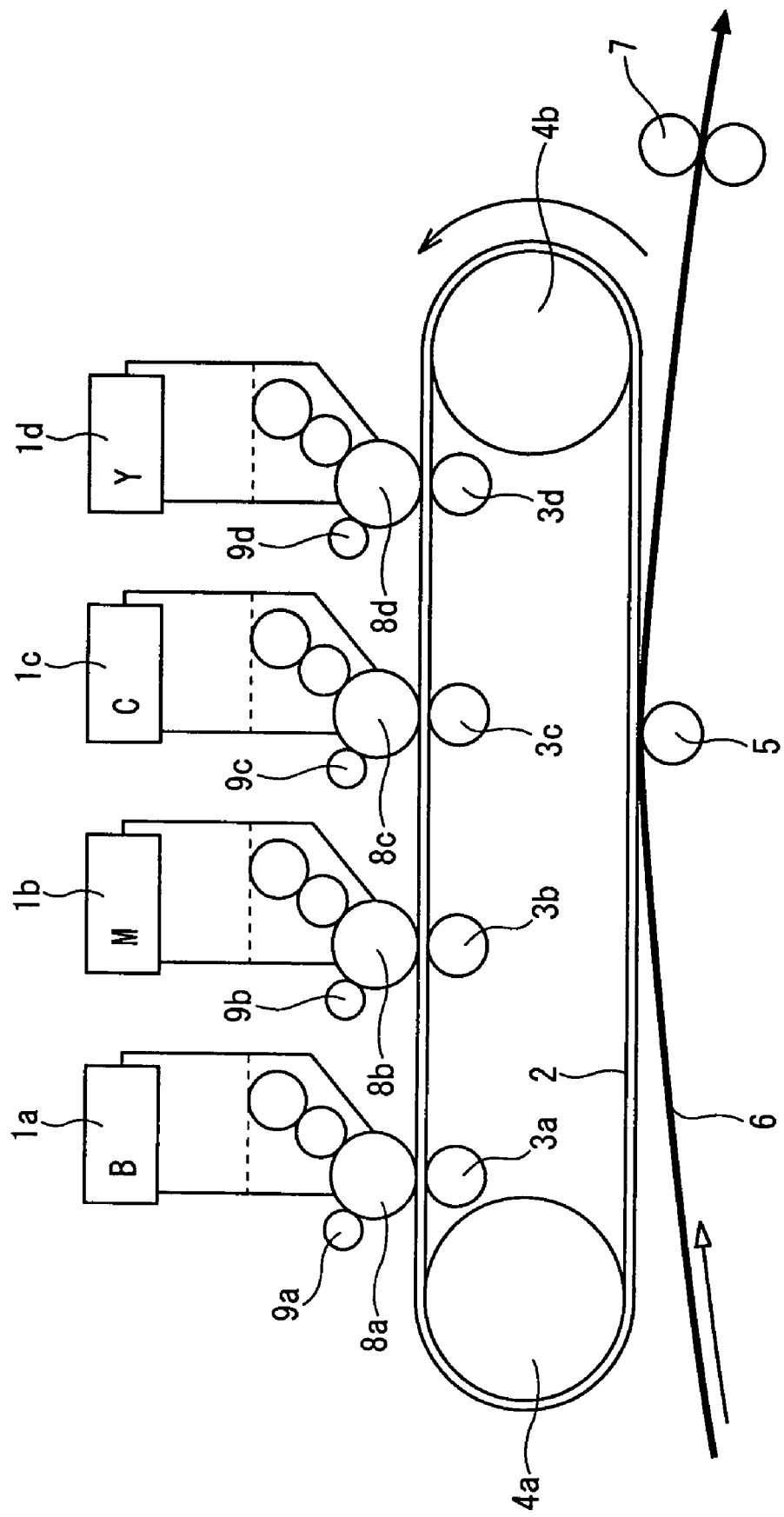
FIG. 2 shows an example of a main construction of a tandem system color printer having the conductive belt of the present invention as an intermediate transfer belt.

FIG. 2 shows an example of a main construction of a tandem system color printer having the conductive belt of the present invention as an intermediate transfer belt 2. The tandem system color printer has independent developing units 1a through 1d for B, M, C, and Y respectively and is capable of almost simultaneously accomplishing printing of the four colors. Thus the tandem system color printer is capable of accomplishing printing at a higher speed than a four-cycle system.

The color printer has primary transfer rollers 3a through 3d, an intermediate transfer belt 2, driving rollers 4a, 4b for driving the intermediate transfer belt, a secondary transfer roller 5, and a fixing unit 7 in addition to developing units 1a through 1d. electrophotographic photoreceptors 8a through 8d and charging rollers 9a through 9d are incorporated inside the developing units 1a through 1d respectively. The electrophotographic photoreceptors 8a through 8d confront the primary transfer rollers 3a through 3d respectively through the intermediate transfer belt 2.

Inside each developing unit 1, charging of the electrophotographic photoreceptor 8, exposure, formation of an electrostatic image, and development with toner are performed. A toner image on the electrophotographic photoreceptor 8 is transferred to the intermediate transfer belt 2 tensionally mounted on the driving rollers 4a, 4b by applying a transfer voltage to the primary transfer roller 3.

The intermediate transfer belt 2 is driven by the driving shafts 4a, 4b in a direction shown with an arrow of FIG. 2. The toners in the different colors are superimposed one on the other at a predetermined position where a color image is formed. The color image formed on the intermediate transfer belt 2 is transferred to a recording medium 6 such as paper by applying a secondary transfer voltage to the secondary transfer roller 5. The toner image on the recording medium 6 is fused and fixed to the recording medium 6 by the fixing unit 7.

Figure 3:
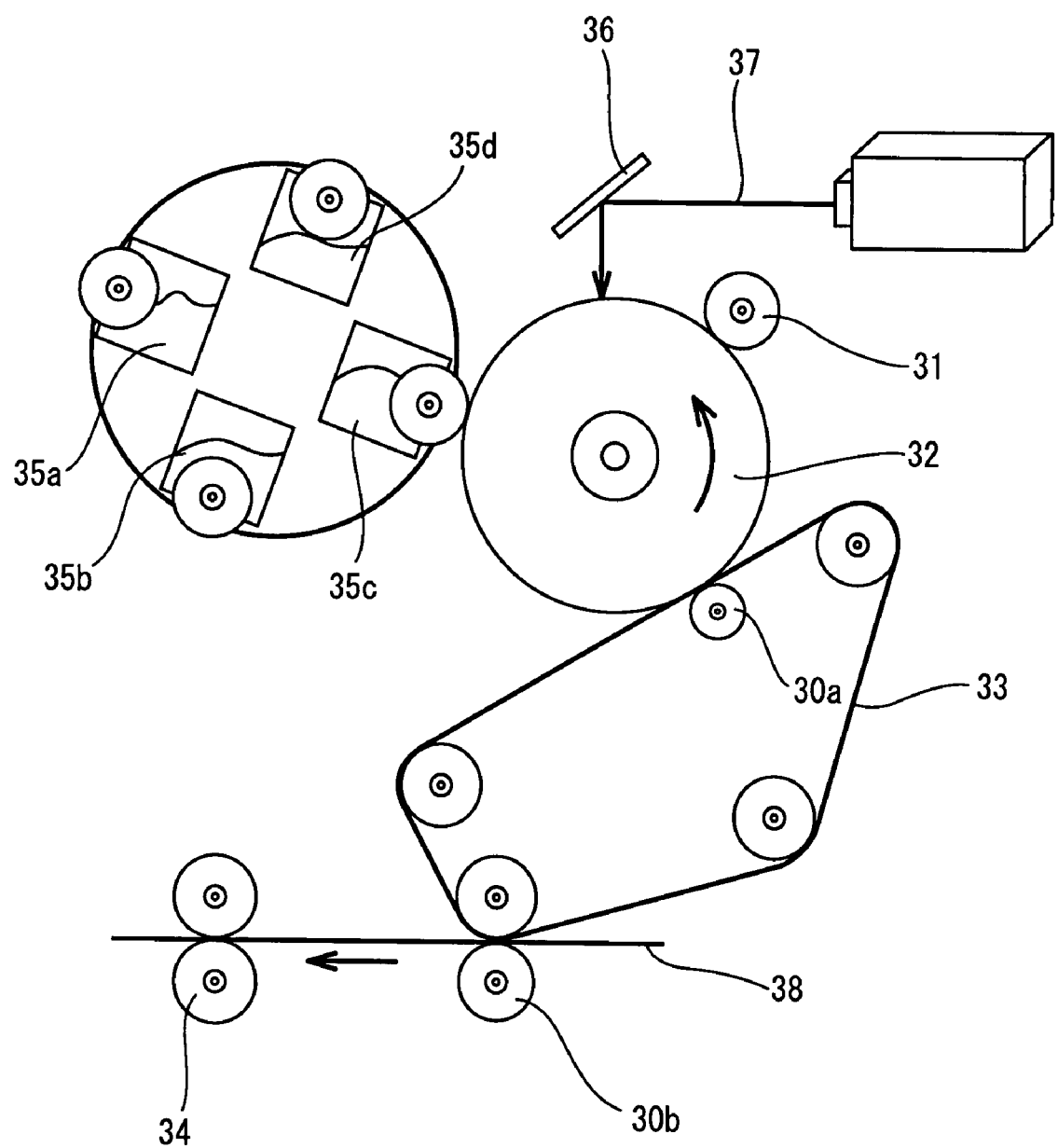
FIG. 3 shows an example of a main construction a one-drum system color printer having the conductive belt of the present invention as an intermediate transfer belt.

FIG. 3 shows an example of a main construction a one-drum system color printer having the conductive belt of the present invention as an intermediate transfer belt 33.

In the one-drum system color printer, a printing unit holding four colors C, M, Y, and K as a unit is utilized. Color printing is carried out by rotating the printing unit.

The color printer has transfer rollers 30a, 30b, an electrophotographic photoreceptor 32, an intermediate transfer belt 33, a fixing roller 34, and toner 35 (35a, 35b, 35c, and 35d) of four colors.

In forming an image, initially, the electrophotographic photoreceptor 32 rotates in a direction shown with the arrow of FIG. 3. After the electrophotographic photoreceptor 32 is charged by the charging roller 31, a laser 37 exposes a non-imaging portion of the electrophotographic photoreceptor 32 via the mirror 36. As a result, the non-imaging portion is destaticized. The portion of the electrophotographic photoreceptor 32 corresponding to an imaging portion is charged. Thereafter the toner 35a is supplied to the electrophotographic photoreceptor 32 and attaches to the charged imaging portion to form a first-color toner image. An electric field is applied to the primary transfer roller 30a to transfer the toner image to the intermediate transfer belt 33.

In the same manner, a toner image of each of the other toners 35b to 35d formed on the electrophotographic photoreceptor 32 is transferred to the intermediate transfer belt 33. A full-color image composed of the four-color toners 35a through 35d is formed on the intermediate transfer belt 33. An electric field is applied to the secondary transfer roller 30b to transfer the full-color image to a to-be-transferred material 38 such as paper. When the to-be-transferred material 38 passes between a pair of the fixing rollers 34 heated to a predetermined temperature, the full-color image is transferred to the surface thereof.

In performing double-side printing, the to-be-transferred material 38 or the like that has passed the fixing roller 34 is inverted inside the printer. Then the above-described image-forming processes are repeated. Thereby an image is formed on the rear surface of the to-be-transferred material 38.

The examples of the conductive belt of the present invention and comparison examples are described in detail below.

Example 1

Carbon nano-fiber having properties shown below and the polybutylene naphthalate resin ("PELPRENE P560 produced by TOYOBO Co., Ltd.) were meltingly kneaded to obtain a conductive master batch A. Carbon nano-fiber was mixed to become 5 mass % of the conductive master batch A. Property of carbon nano-fiber DBP oil absorption amount: 250 ml/100 g
Volume resistance value of compacted body: $4 \times 10^{-2}$ Ω·cm
BET specific surface area: 280 m²/g After a pellet of the obtained conductive master batch A and a pellet of the polybutylene naphthalate resin ("PELPRENE P560 produced by TOYOBO Co., Ltd.) were so metered that the mass ratio was 30:70, they were dry-blended. An obtained mixture was supplied to the hopper 11 of the molder 10 shown in FIG. 1. Thereafter the mixture was extruded vertically downward from the die lip 13a of the annular die of the cross head die 13 under conditions that the temperature of the extruder (temperature of cylinder) was 250 to 290° C., the temperature of the gear pump was 270° C., the temperature of the die was 260 to 280° C., and the number of rotations of the gear pump was seven. After the melt was cooled by feeding it along the inside sizing 15 to harden and shape it, it is pulled vertically downward at a speed of 1 m/minute by the take-off unit 16. Thereafter the hardened continuous extruded tube is cut in a width of 400 mm by the automatic cutting machine 17. In this manner, a continuous conductive belt of the present invention was obtained. In the obtained conductive belt, the content of the carbon nano-fiber: 1.5 mass %, the inner diameter of the belt: 200 mm, and the average thickness: 150 μm.

Example 2

Except that the mixing ratio (mass ratio) between the conductive master batch A and the polybutylene naphthalate resin was set to 40:60, the conductive belt of the present invention was formed in the same manner as that of the example 1. In the obtained conductive belt, the content of the carbon nano-fiber was 2 mass %, the inner diameter of the belt: 200 mm, and the average thickness: 150 μm.

Comparison Example 1

The carbon black ("Denka black" produced by Denkikagaku Kogyo Kabushiki Kaisha) and the polybutylene naphthalate resin ("PELPRENE P560 produced by TOYOBO Co., Ltd.) were kneaded to obtain a pellet-shaped conductive master batch B by using a strand cutter. The carbon black was mixed to become 15 mass % of the conductive master batch B.

The obtained conductive master batch B was supplied to the hopper 11 of the molder 10 to extrusion-mold it in the same condition as that of the example 1.

The obtained belt was brittle. Further a large number of agglomerations of carbon black was found. Thus it was impossible to put it into practical use.

Comparison Example 2

The same carbon nano-fiber as that used in the example 1 was mixed to the polybutylene naphthalate resin ("PELPRENE P560 produced by TOYOBO Co., Ltd.) to become two mass % of a conductive master batch C, and the carbon nano-fiber and the polybutylene naphthalate resin were meltingly kneaded to obtain the conductive master batch C.

The obtained conductive master batch B was supplied to the hopper 11 of the molder 10 to extrusion-mold it in the same condition as that of the example 1. In the obtained conductive belt, the content of the carbon nano-fiber: 2 mass %, the inner diameter of the belt: 200 mm, and the average thickness: 150 μm.

Comparison Example 3

The conductive master batch A used in the example 1 was supplied to the hopper 11 of the molder 10 to extrusion-mold it in the same condition as that of the example 1.

The melt hardened in the vicinity of the inside housing 15 was so brittle that it could not be applied to the take-off unit 16. Thus a belt could not be obtained.

The following examinations were conducted on the belts of the examples 1, 2 and the comparison example 2.

Measurement of Volume Resistivity

The volume resistivity (Ω·cm) of each belt at 30 in-plane points was measured by using a URS probe of Hiresta UP MCP-HT 450 type produced by Dia Instrument Co., Ltd. As conditions of the measurement, the voltage-applied period of time was 10 seconds, and the applied voltage was 250V. Measured values at the 30 points were averaged. As the measuring environment, the temperature was set to 23° C., and the relative humidity was set to 55%.

Continuous Driving Examination

Each belt spanned between two shafts each having a diameter of 20 mm was rotated 10,000 times at a speed of 200 mm/second in environment having a temperature of 23° C. and a relative humidity of 55%. The state of the conductive belt was visually observed.

The volume resistivity of each belt was as shown below:
Example 1: $3.7 \times 10^{11}$ Ω·cm
Example 2: $6.8 \times 10^{9}$ Ω·cm
Comparison example 2: $2.7 \times 10^{8}$ Ω·cm It was confirmed that the belt of each of the examples 1 and 2 was not crackled or torn after the continuous driving examination was conducted and showed a favorable durability. On the other hand, the belt of the comparison example 2 was so brittle that it was broken when it was bent. Thus when the belt was rotated continuously with the belt spanned between shafts, it was easily broken.

What is claimed is:

1. A method of producing a conductive belt composed of a base resin containing polybutylene naphthalate resin at not less than 50 mass % nor more than 100 mass % of a total mass of said base resin and carbon nano-fibers having a DBP oil absorption amount of not less than 150 ml/100 g in an amount of 1 to 3 mass % of the total mass of said conductive belt;

said method comprising the steps of:
forming a conductive master batch by mixing said carbon nano-fibers with a first resin for use in a master batch containing said polybutylene naphthalate resin, wherein said carbon nano-fibers are contained in said conductive master batch in an amount of 3 to 8 mass %;

mixing said obtained conductive master batch and a second resin for blending use containing said polybutylene naphthalate resin and not containing said carbon nano-fibers, with each other in an unmelted state and at a mixing mass ratio of said conductive master batch to said second resin for blending use of 4:6 to 3:7 to form an obtained mixture; and melting by extrusion molding the obtained mixture to form the conductive belt, wherein said carbon nano-fibers are contained in said conductive master batch in an amount larger than said carbon nano-fibers are contained in said conductive belt.

2. The method according to claim 1, wherein said conductive master batch is formed by mixing said carbon nano-fibers with a melted first resin for use in a master batch containing said polybutylene naphthalate resin.

3. The method according to claim 1, wherein said carbon nano-fiber has a diameter of 0.5 to 500 nm.

4. The method according to claim 1, wherein said carbon nano-fiber is a nano-tube and has a diameter of 5 to 100 nm.

5. The method according to claim 2, wherein said carbon nano-fiber has a diameter of 0.5 to 500 nm.

6. The method according to claim 2, wherein said carbon nano-fiber is a nano-tube and has a diameter of 5 to 100 mm.

* * * * *